United States Patent [19]

Sawada et al.

[11] Patent Number: 4,835,069
[45] Date of Patent: May 30, 1989

[54] MAGNETIC RECORDING MEDIUM

[75] Inventors: Takeshi Sawada, Yokohama; Akira Shinmi, Kawasaki; Hiroshi Takagi, Yokohama; Kenji Suzuki; Fumio Kishi, both of Kawasaki; Susumu Kozuki, Tokyo, all of Japan

[73] Assignees: Canon Kabushiki Kaisha; Tohoku Steel Co. Ltd., both of Tokyo, Japan

[21] Appl. No.: 637,279

[22] Filed: Aug. 3, 1984

[30] Foreign Application Priority Data

| Aug. 6, 1983 | [JP] | Japan | 58-144114 |
| Aug. 6, 1983 | [JP] | Japan | 58-144115 |
| Aug. 6, 1983 | [JP] | Japan | 58-144116 |
| Nov. 17, 1983 | [JP] | Japan | 58-216839 |

[51] Int. Cl.$^4$ .............................................. G11B 5/64
[52] U.S. Cl. .................................. 428/694; 427/128; 428/900
[58] Field of Search .............. 428/693, 900, 694, 695; 427/132, 131, 128; 204/192 M; 760/134–136

[56] References Cited

U.S. PATENT DOCUMENTS

| 3,206,325 | 9/1965 | Averbach | 427/132 |
| 4,087,582 | 5/1978 | Shinahata | 427/131 |
| 4,407,901 | 10/1983 | Miyatsuka | 428/694 |
| 4,439,486 | 3/1984 | Yamada | 428/336 |

Primary Examiner—Paul J. Thibodeau
Attorney, Agent, or Firm—Fitzpatrick, Cella, Harper & Scinto

[57] ABSTRACT

A magnetic recording medium having a magnetic layer formed by a thin film deposition method, said magnetic layer comprising Fe as the principal component together with Co, Ni, and Cr, further containing at least one element selected from the group consisting of Ti, Zr, Hf, V, Nb, Ta, Mo, W, Cu, Mn and Sb.

2 Claims, 3 Drawing Sheets

MAGNETIC RECORDING MEDIUM

CROSS-REFERENCE TO RELATED APPLICATION

This application contains subject matter related to pending Application Ser. No. 635,234, filed July 27, 1984.

BACKGROUND OF THE INVENTION

1. Field of the Invention

This invention relates to magnetic recording media having a magnetic layer formed by thin film deposition methods, particularly magnetic recording media excellent in corrosion resistance, characteristic stability of the magnetic layer.

2. Description of the Prior Art

In recent years, the research and development of magnetic recording media have become active on the production thereof by thin film deposition methods such as vacuum deposition, sputtering, and plating methods. These methods fullfil the requirements of high density recording to a great extent in that (1) the resulting recording media exhibit high residual magnetic flux density, (2) magnetic recording media having strong coercive force can be formed, and (3) thin magnetic recording layers can be formed. Alloys constituted principally of Co and I have hitherto been used as magnetic materials for those recording media. In particular, a Co—20 wt% Ni alloy has been studied extensively. Reasons for this, generally considered, are that; this alloy has relatively high corrosion resistance; such alloys containing 70 wt% or more of Co have h.c.p. structure (hexagonal closs-packed structure); and the magnetic anisotropy thereof can be controlled with ease to excellent in-plane anisotropy.

However, this kind of alloy is very expensive because of the Co content as high as 70% or more, usually about 80%. An additional problem is that the price of Co must varies with the international situation. The corrosion resistance of these alloys also is unsatisfactory under harsh environmental conditions.

SUMMARY OF THE INVENTION

An object of the present invention is to improve the drawbacks as mentioned above and provide magnetic recording media with reduced content of Co which can be supplied stably at low cost and also a magnetic recording media having excellent magnetic characteristics, corrosion resistance and characteristic stability of the magnetic layer.

The present invention provides a magnetic recording medium having a magnetic layer formed by a thin film deposition method, comprising a magnetic layer composed principally of Fe, containing Co and Ni, Cr, and further at least one element selected from Ti, Zr, Hf, V, Nb, Ta, Mo, Cu, Mn, and Sb, which can be formed by utilizing a thin film deposition method such as the induction-heating vapor deposition method, the resistance-heating vapor deposition method, the electron-beam vapor deposition method, the sputtering method, the ion plating method, and the electroplating or electroless plating method.

It has been recognized that magnetic characteristics equal to or better than that of the Co-Ni alloy of the prior art can be obtained in a magnetic layer material containing 50 wt% or more of the sum of Co and Fe, by replacement of Co with Fe element so that Fe may be the principal component. Although replacement of Co with Fe results in deterioration of corrosion resistance, addition of Cr is effective for improvement of corrosion resistance. Further, by addition of at least one element of Ti, Zr, Hf, V, Nb, Ta, Mo, W, Mn, Cu, and Sb together with Cr, improvement of stability of magnetic characteristics was also recognized at the same time that corrosion resistance, was enhanced.

According to the present invention, there is provided a magnetic recording medium having a magnetic layer formed by a thin film deposition method, characterized in that the magnetic layer contains Fe as the principal component together with Co, Ni, and Cr, and at least one selected from the group consisting of Ti, Zr, Hf, V, Nb, Ta, Mo, W, Cu, Mn, and Sb.

DETAILED DESCRIPTION OF EMBODIMENTS OF THE INVENTION

Figure 1:
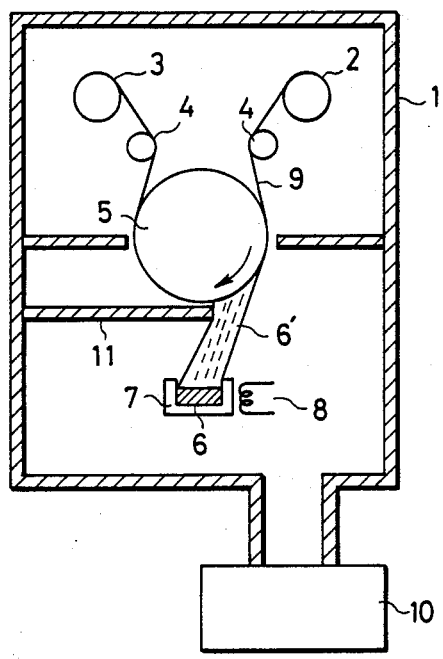
FIG. 1 is a schematic illustration of an apparatus used in the present invention for the preparation of the vapor deposited tape.

In the magnetic material to be used in the present invention, Fe, Ni, Cr, Ti, Zr, Hf, V, Nb, Ta, Mo, W, Mn, Cu, and Sb have the respective actions as described below. Fe enhances the magnetic moment per one atom to increase the residual magnetic flux density Br, as well as increase of ductility, thereby preventing generation of crack or flaw in the magnetic layer. On the other hand, as mentioned above, rapid deterioration of the corrosion resistance results from the increase of Fe content, and the effect of increasing the residual magnetic flux density is rather lowered if the Fe content exceeds a certain level. Ni in the magnetic materials improves the corrosion resistance and ductility and also prevents generation of crack or flaw in the magnetic layer. Cr contributes to improvement of corrosion resistance. In particular, since Cr is different greatly in vapor pressure from Fe, Co, and Ni, the characteristics of the magnetic layer are liable to fluctuate. However, by replacement of a part of Cr with Ti, Zr or Hf, the magnetic characteristics can be stabilized. If the amount of Cr, Ti, Zr, and Hf added singly or in any combination is too much, magnetic characteristics of the magnetic layer may be lowered, such as reduction of Br.

As a consequence of the above description, a good composition of the magnetic layer may be represented by the formula:

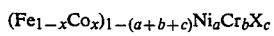

$$(Fe_{1-x}Co_x)_{1-(a+b+c)}Ni_aCr_bX_c$$

wherein X is at least one of Ti, Zr, and Hf, the weight ratios being $0 < x \leq 0.5$, $0.05 \leq a \leq 0.20$, $0.01 \leq b \leq 0.15$, and $0.005 \leq c \leq 0.15$, particularly preferably Ti, Zr, and Hf alone or the sum of the two or the three being 3 to 12 wt%, Cr being 1 to 6 wt%, Ni being 7 to 14% and Co being 17 to 25 wt%, the remainder being Fe.

Also by adding V, Nb, Ta, Mo, and W alone or in a combination, corrosion resistance can be improved. Since Cr is different greatly in vapor pressure from Fe, Co, and Ni, the characteristics of the magnetic layer are liable to fluctuate. However, by replacement of a part of Cr with V, Nb, Ta, Mo, and W, the magnetic characteristics can be stabilized. However, if the amount of the non-magnetic element added is too much, magnetic characteristics of the magnetic layer may be lowered, such as reduction of Br.

As a consequence of the above description, a good composition of the magnetic layer may be represented by the formula:

$$(Fe_{1-x}Co_x)_{1-(a+b+c)}Ni_aCr_bX_c$$

wherein X is at least one selected from V, Nb, Ta, Mo, and W, the weight ratios being $0<x\leq0.5$, $0.05\leq a\leq0.2$, $0.01\leq b\leq0.15$, and $0.005\leq c\leq0.15$, particularly preferably Cr being 1 to 6 wt%, X being 2 to 12 wt% and the sum of Cr and X being 15 wt% or less, Co being 20 to 30 wt%, Ni being 7 to 15 wt%, the remainder being Fe.

As described above, since Cr is different greatly in vapor pressure from Fe, Co, and Ni, the characteristics of the magnetic layer are liable to fluctuate. However, by replacement of a part of Cr with Cu and/or Mn, the magnetic characteristics can be stabilized. However, if the amount of Cr, Mn, and Cu added singly or in any combination is too much, magnetic characteristics of the magnetic layer may be lowered, such as reduction of Br.

As a consequence of the above description, a good composition of the magnetic layer may be represented by the formula:

$$(Fe_{1-x}Co_x)_{1-(a+b+c)}Ni_aCr_bX_c$$

wherein X=Mn and/or Cu, the weight ratios being $0<x\leq0.5$, $0.05\leq a\leq0.20$, $0.01\leq b\leq0.15$ and $0.005\leq c\leq0.18$, particularly preferably Cu and Mn each alone or the sum of both being 3 to 12 wt%, Cr being 1 to 6 wt%, and the sum of Cr and X being 15 wt% or less, Ni being 7 to 14 wt%, Co being 20 to 30 wt%, the remainder being Fe.

Also, Sb improves abrasion resistance. However, if Cr or Sb or both added is too much, magnetic characteristics of the magnetic layer may be lowered, such as reduction of Br.

Accordingly, a preferably composition of the magnetic layer may be represented by the formula:

$$(Fe_{1-x}Co_x)_{1-(a+b+c)}Ni_aCr_bSb_c$$

wherein the weight ratios being $0<x\leq0.5$, $0.05\leq a\leq0.20$, $0.01\leq b\leq0.15$, $0.001\leq c\leq0.10$, and $b+c\leq0.20$, particularly preferably Cr being 1 to 6 wt%, Sb being 1 to 8 wt%, the sum of Cr and Sb being 3 to 12 wt%, Ni being 7 to 14 wt%, Co being 20 to 30 wt%, the remainder being Fe.

The present invention is to be described in detail below. FIG. 1 shows an apparatus for preparation of a vapor deposited tape which is one of the magnetic recording media. Within a vacuum chamber 1, there are arranged a film wind-out reel 2, a winding reel 3, intermediate free rollers 4, a cooling drum 5, a vessel 7 containing a feedstock 6 for vapor deposition, and an electron beam generating source 8. A continuous poly (ethyleneterephthalate) film 9 with a width of 100 mm and a thickness of 15 μm is delivered from the film wind-out reel 2 via the intermediate free roller 4 and the cooling drum 5 to the film winding reel 3. The vapor deposition material 61 is housed in the vessel 7 and arranged so as to confront the cooling drum, and heated with an electron beam from the electron beam generating source 8. The heated material is evaporated to a vapor stream 6, which adheres onto the film 9 running on the cooling drum 5. The incident angle of the vapor stream 6, to be deposited on the film 9 is restricted to 60°–90° by a baffle 11 and, accordingly, such deposition process is well known to the art as the oblique incidence deposition method.

EXAMPLES 1–12

By use of the alloys containing the elements as indicated in Table 1 for the vapor deposition material, vapor deposited tapes were prepared by means of the apparatus shown in FIG. 1.

Within the vacuum chamber 1, a vacuum degree of $1\times10^{-4}$ to $5\times10^{-6}$ Torr was maintained by the evacuation system 10 during the film formation. The film feeding speed was controlled to 10 m/min. and the thickness of the completed magnetic layer was approximately 1000 Å.

TABLE 1

| No. | Content (wt. %) | | | | | | | Corrosion resistance | Characteristic stability |
|---|---|---|---|---|---|---|---|---|---|
| | Fe | Co | Ni | Cr | Ti | Zr | Hf | | |
| 1 | 57 | 22 | 13 | 8 | 0 | 0 | 0 | ○ | △ |
| 2 | 65 | 16 | 13 | 6 | 0 | 0 | 0 | ◎ | △ |
| 3 | 61 | 24 | 15 | 0 | 0 | 0 | 0 | x | ◎ |
| 4 | 59 | 21 | 9 | 6 | 5 | 0 | 0 | ◎ | △ |
| 5 | 57 | 20 | 12 | 2 | 9 | 0 | 0 | ◎ | ◎ |
| 6 | 62 | 20 | 11 | 3 | 0 | 4 | 0 | ◎ | ◎ |
| 7 | 58 | 19 | 10 | 2 | 0 | 11 | 0 | ◎ | ◎ |
| 8 | 60 | 20 | 13 | 3 | 0 | 0 | 4 | ◎ | ◎ |
| 9 | 56 | 18 | 13 | 3 | 0 | 0 | 10 | ◎ | ◎ |
| 10 | 59 | 21 | 10 | 3 | 3 | 4 | 0 | ◎ | ◎ |
| 11 | 59 | 22 | 10 | 3 | 2 | 2 | 2 | ◎ | ◎ |
| 12 | 0 | 80 | 20 | 0 | 0 | 0 | 0 | x | ◎ |

Table 1 shows the compositions of the magnetic layers of the vapor deposited tapes prepared according to the above method and the results of corrosion resistance and characteristic stability tests. Corrosion resistance test was conducted by measuring the change in residual magnetic flux density after leaving the tape prepared according to the above Examples in a thermo-hygrostat at 60° C. and 90% R.H. to stand for 1000 hours. In Table 1, ◎ shows less than 5% of lowering in Br, ○ 5 to 10%, and x higher than 10%. The test for characteristic stability of the magnetic layer was performed by recording and reproducing by use of a VTR deck for domestic use, and measuring the length of the region where 5% or more of output change occurred within 100 m of the tape. In Table 1, ◎ shows less than 2% of the region where 5% or more output change occuured, ○ 2 to 5%, and △ 6 to 10%.

Figure 2:
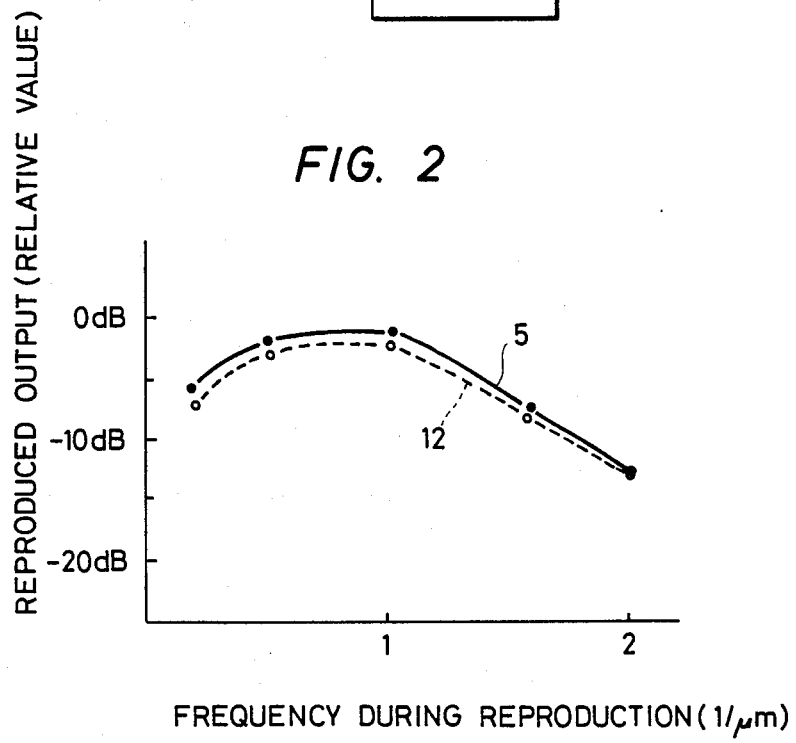
FIG. 2 is a graph showing comparison of the reproduced output for respective frequencies of the No. 5 tape in Table 1 and the Co-Ni tape No. 12.

FIG. 2 shows the reproduced output when recorded and reproduced by use of a VTR deck for domestic use. The reproduced output of the tape No. 5 of the present invention is shown by the curve 5, and that of the Co-Ni tape No. 12 prepared for the purpose of comparison under the same condition by the curve 12. The tape No.

5 of the present invention gave a reproduced output which was equal to or higher by 2 dB as compared with the tape No. 12 of the prior art. In Table 1, the tapes of No. 1-4 and 6-10 exhibited reproduced outputs which were higher than that of the Co-Ni tape.

EXAMPLES 13-17

By use of alloys of Fe, Co, Ni, Cr, and V for the vapor deposition material, vapor deposited tapes were prepared according to the same procedure as in Examples 1 to 12. Table 2 shows the compositions of the magnetic layers and the results of the tests of corrosion resistance and characteristic stability (output change) of the vapor deposited tapes prepared according to the above method. The test method and evaluations were the same as in Exampls. 1 to 12.

Figure 3:
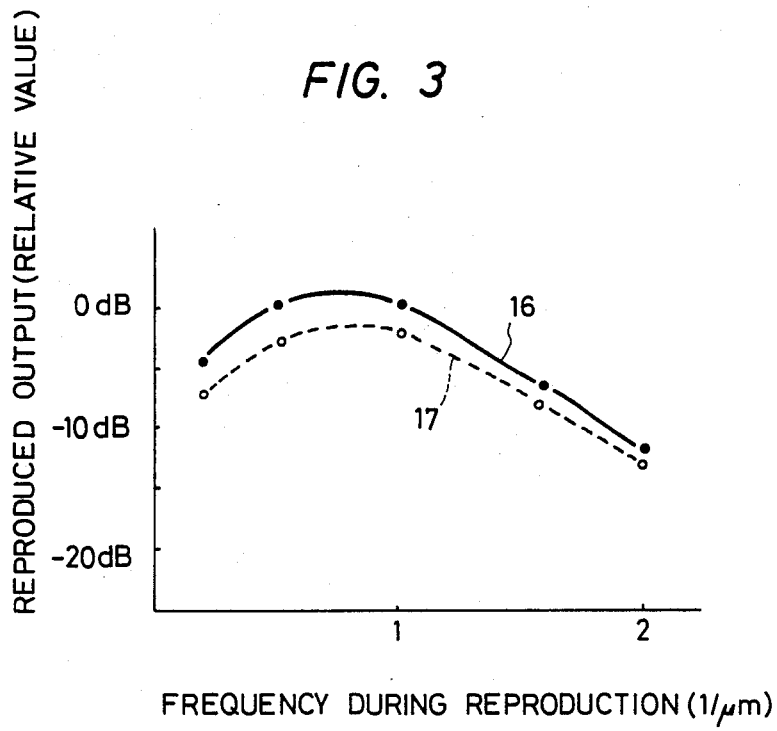
FIG. 3 is a graph showing comparison of the reproduced outputs of the No. 16 tape in Table 2 and the Co-Ni tape No. 17.

FIG. 3 shows the reproduced output when recorded and reproduced by use of a VTR deck for domestic use. The reproduced output of the tape No. 16 of the present invention is shown by the curve 16, and that of the Co-Ni tape No. 17 prepared for the purpose of comparison under the same condition by the curve 17. The tape No. 16 of the present invention gave reproduced output which was higher by 1 to 3 dB as compared with the tape No. 17 of the prior art.

TABLE 2

| Sample No. | Content (wt. %) | | | | | Corrosion resistance | Characteristic stability |
|---|---|---|---|---|---|---|---|
| | Fe | Co | Ni | Cr | V | | |
| 13 | 61 | 24 | 15 | 0 | 0 | x | ◉ |
| 14 | 57 | 22 | 13 | 8 | 0 | ○ | Δ |
| 15 | 57 | 21 | 13 | 6 | 3 | ◉ | Δ |
| 16 | 56 | 22 | 11 | 3 | 8 | ◉ | ◉ |
| 17 | 0 | 80 | 20 | 0 | 0 | x | ◉ |

EXAMPLES 18-20

By use of alloys of Fe, Co, Ni, Cr, and Nb for the vapor deposition material, vapor deposited tapes were prepared according to the same procedure as in Examples 1 to 12. Table 3 shows the relationships between compositions of the magnetic layers and the results of the tests of corrosion resistance and characteristics stability. The test method and evaluations were the same as in Examples 1 to 12.

EXAMPLES 21-23

By use of alloys of Fe, Co, Ni, Cr, and Ta for the vapor deposition material, vapor deposited tapes were prepared according to the same procedure as in Examples 1 to 12. Table 4 shows the relationships between compositions of the magnetic layers and the results of the tests of corrosion resistance and characteristic stability. The test method and evaluations were the same as in Examples 1 to 12.

EXAMPLES 24-26

By use of alloys of Fe, Co, Ni, Cr, and Mo for the vapor deposition material, vapor deposited tapes were prepared according to the same procedure as in Examples 1 to 12. Table 5 shows the relationships between compositions of the magnetic layers and the results of the tests of corrosion resistance and characteristic stability. The test method and evaluations were the same as in Examples 1 to 12.

TABLE 3

| Sample No. | Content (wt. %) | | | | | Corrosion resistance | Characteristic stability |
|---|---|---|---|---|---|---|---|
| | Fe | Co | Ni | Cr | Nb | | |
| 18 | 58 | 24 | 12 | 3 | 3 | ○ | ◉ |
| 19 | 59 | 23 | 10 | 6 | 2 | ◉ | Δ |
| 20 | 56 | 21 | 11 | 3 | 9 | ◉ | ◉ |

TABLE 4

| Sample No. | Content (wt. %) | | | | | Corrosion resistance | Characteristic stability |
|---|---|---|---|---|---|---|---|
| | Fe | Co | Ni | Cr | Ta | | |
| 21 | 63 | 18 | 14 | 2 | 3 | ○ | ◉ |
| 22 | 59 | 22 | 9 | 7 | 3 | ◉ | Δ |
| 23 | 55 | 20 | 12 | 3 | 10 | ◉ | ◉ |

TABLE 5

| Sample No. | Content (wt. %) | | | | | Corrosion resistance | Characteristic stability |
|---|---|---|---|---|---|---|---|
| | Fe | Co | Ni | Cr | Mo | | |
| 24 | 57 | 24 | 12 | 3 | 4 | ◉ | ◉ |
| 25 | 57 | 25 | 10 | 5 | 3 | ◉ | ○ |
| 26 | 56 | 22 | 10 | 3 | 9 | ◉ | ◉ |

EXAMPLES 27-29

By use of alloys of Fe, Co, Ni, Cr, and W for the vapor deposition material, vapor deposited tapes were prepared according to the same procedure as in Examples 1 to 12. Table 6 shows the relationships between compositions of the magnetic layers and the results of the tests of corrosion resistance and characteristic stability. The test method and evaluations were the same as in Examples 1 to 12.

EXAMPLES 30-31

By use of alloys of Fe, Co, Ni, Cr to which (V and Nb) or (V, Nb, and Mo) were added for the vapor deposition material, vapor deposited tapes were prepared according to the same procedure as in Examples 1 to 12. Table 7 shows the relationships between compositions of the magnetic layers and the results of the tests of corrosion resistance and characteristic stability. The test method and evaluations were the same as in Examples 1 to 12.

The tapes of Examples 8-31 were also recognized to give reproduced outputs which are equal to or better than the Co-Ni tape No. 17 of the prior art. It was also recognized that two kinds, three kinds or more of the combinations of the additive elements of V, Nb, Ta, Mo, and W other than the combinations of Nb and Mo in Examples 30 and 31 were also effective for improvement of corrosion resistance and characteristic stability.

TABLE 6

| Sample No. | Content (wt. %) | | | | | Corrosion resistance | Characteristic stability |
|---|---|---|---|---|---|---|---|
| | Fe | Co | Ni | Cr | W | | |
| 27 | 62 | 20 | 12 | 3 | 3 | ○ | ○ |
| 28 | 54 | 22 | 11 | 3 | 10 | ◉ | ◉ |
| 29 | 56 | 25 | 10 | 7 | 2 | ◉ | Δ |

TABLE 7

| Sample No. | Content (wt. %) | | | | | | Corrosion resistance | Characteristic stability |
|---|---|---|---|---|---|---|---|---|
| | Fe | Co | Ni | Cr | V | Nb | Mo | | |
| 30 | 58 | 21 | 11 | 3 | 3 | 4 | — | ◉ | ◉ |

TABLE 7-continued

| Sample | Content (wt. %) | | | | | | Corrosion | Characteristic |
| No. | Fe | Co | Ni | Cr | V | Nb | Mo | resistance | stability |
| --- | --- | --- | --- | --- | --- | --- | --- | --- | --- |
| 31 | 57 | 22 | 11 | 2 | 3 | 3 | 2 | ◎ | ◎ |

EXAMPLES 32-40

By use of alloys containing the elements as indicated in Table 8 the vapor deposition material 6, vapor deposited tapes were prepared according to the same procedure as in Exaples 1 to 12. Table 8 shows the compositions of the magnetic layers and the results of the tests of corrorion resistance and characteristic stability of the vapor deposited tapes prepared according to the above method. The test method and evaluations were the same as in Examples 1 to 12.

Figure 4:
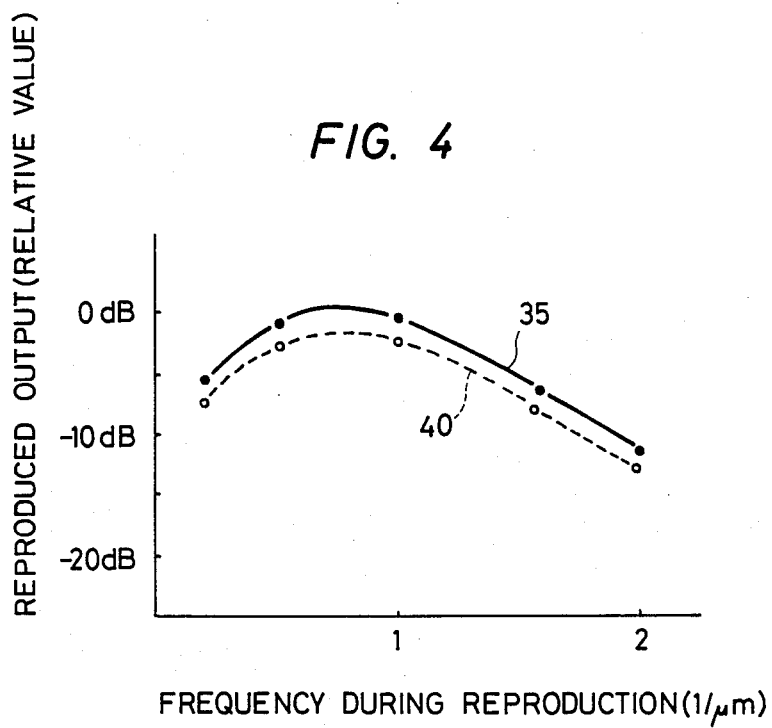
FIG. 4 is a graph showing comparison of the reproduced outputs for respective frequencies of the No. 35 tape in Table 8 and the Co-Ni tape No. 40.

FIG. 4 shows the reproduced output when recorded and reproduced by use of a VTR deck for domestic use. The reproduced output of the tape No. 35 of the present invention is shown by the curve 35, and that of the Co-Ni tape No. 40 prepared for the purpose of comparison under the same condition by the curve 40. The tape of the present invention gave a reproduced output which was higher by 2 dB as compared with the tape No. 40 of the prior art. For the tapes with the compositions of No. 32, No. 32, and No. 36-No. 39, reproduced outputs which were higher than that of the Co-Ni tape could be obtained.

TABLE 8

| Sample | Content (wt. %) | | | | | | Corrosion | Characteristic |
| No. | Fe | Co | Ni | Cr | Cu | Mn | resistance | stability |
| --- | --- | --- | --- | --- | --- | --- | --- | --- |
| 32 | 57 | 22 | 13 | 8 | 0 | 0 | ○ | △ |
| 33 | 65 | 16 | 13 | 6 | 0 | 0 | ○ | △ |
| 34 | 61 | 24 | 15 | 0 | 0 | 0 | x | ◎ |
| 35 | 57 | 23 | 11 | 3 | 6 | 0 | ◎ | ◎ |
| 36 | 60 | 18 | 8 | 2 | 12 | 0 | ◎ | ◎ |
| 37 | 54 | 22 | 11 | 2 | 0 | 11 | ◎ | ◎ |
| 38 | 64 | 16 | 10 | 3 | 0 | 7 | ◎ | ◎ |
| 39 | 56 | 21 | 11 | 3 | 4 | 5 | ◎ | ◎ |
| 40 | 0 | 80 | 20 | 0 | 0 | 0 | x | ◎ |

As shown in Examples 4-11, 15, 16, 18-31, and 35-39, the present invention can provide magnetic recording media having performances which were higher than that of the Co-Ni tape of the prior art in corrosion resistance, stability of the film characteristics and reproduced outputs, while reducing the content of expensive Co.

EXAMPLES 41-47

By use of alloys containing the elements as indicated in Table 9 for the vapor deposition material 6, vapor deposited tapes were prepared according to the same procedure as in Examples 1 to 12. Table 9 shows the magnetic characteristics of the magnetic layers and the results of the tests of corrosion resistance. The test method and evaluations were the same as in Examples 1 to 12.

Figure 5:
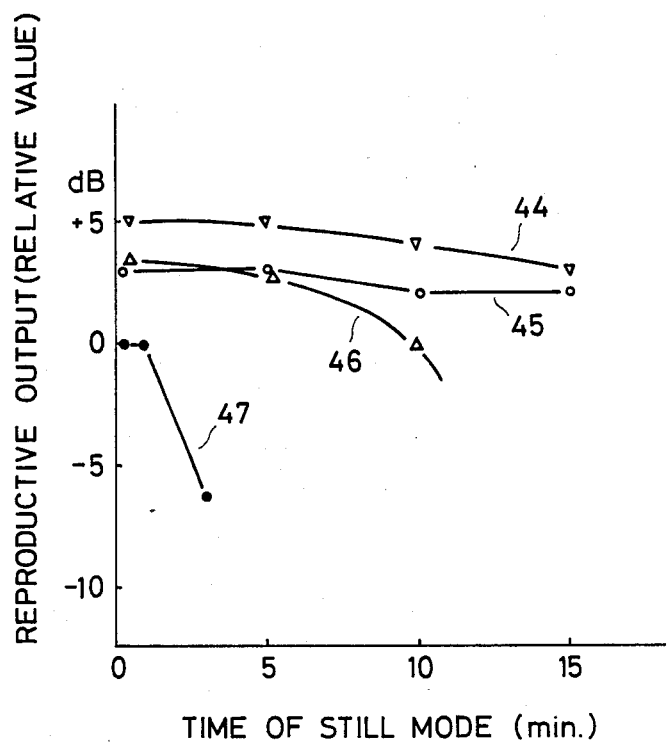
FIG. 5 is a graph showing the results of abrasion resistance tests of the samples in Table 9.

The results of the abration resistance test are shown in FIG. 5.

The samples containing Cr and Sb were recognized to be excellent in corrosion resistance.

FIG. 5 shows the results of abrasion resistance tests practiced for the Samples 44 to 47 in Table 9. Abration resistance test was conducted by use of a VTR deck for domestic use and measuring the change in output value with time when a single frequence of 3.4 MHz is recorded and subjected to still mode reproduction. The curve 44 shows the measurement result of Sample 44, the curve 45 of Sample 45, the curve 46 of Sample 46, and the curve 47 of the Co-Ni tape of Sample 47 prepared under the same condition for the purpose of comparison. The Sample 44 and 45 containing Sb were found to exhibit more excellent abrasion resistance as compared with the tapes of Sample No. 46 containing no Sb and the Co-Ni tape of the Sample 47. Also, for Samples 41 and 42, excellent abrasion resistance similar to sample 44 was observed.

As described above, the magnetic recording medium of the present invention comprises Fe as the principal component and therefore very inexpensive as compared with the Co-Ni alloy system recording medium of the prior art containing Co as the principal component. Moreover, by addition of Cr and Sb elements, corrosion resistance and abrasion resistance were improved to great extent.

TABLE 9

| Sample No. | Residual magnetic flux density (KG.) | Coercivity (Oe) | Composition of respective elements (wt. %) | | | | | Corrosion resistance |
| | | | Fe | Co | Ni | Cr | Sb | |
| --- | --- | --- | --- | --- | --- | --- | --- | --- |
| 41 | 2.2 | 230 | 50 | 21 | 11 | 3 | 15 | ◎ |
| 42 | 3.5 | 260 | 52 | 27 | 9 | 2 | 10 | ◎ |
| 43 | 4.7 | 540 | 55 | 24 | 10 | 3 | 8 | ◎ |
| 44 | 6.2 | 860 | 58 | 22 | 11 | 5 | 4 | ◎ |
| 45 | 7.4 | 890 | 62 | 23 | 12 | 2 | 1 | ○ |
| 46 | 6.7 | 890 | 59 | 22 | 12 | 7 | 0 | ◎ |
| 47 | 3.8 | 930 | 0 | 80 | 20 | 0 | 0 | x |

What we claim is:

1. A magnetic recording medium having a thin ferromagnetic corrosion resistant metallic film formed by an oblique incidence deposition method characterized in that a composition of the thin ferromagnetic metal film layer is represented by the formula:

$$(Fe_{1-x}Co_x)_{1-(a+b+c)}Ni_aCr_bSb_c$$

wherein the weight ratios being $0 < X \leq 0.5$, $0.05 \leq a \leq 0.2$, $0.01 \leq b \leq 0.15$, $0.001 \leq c \leq 0.1$ and $b + c \leq 0.2$.

2. The magnetic recording medium according to claim 1 wherein the composition of the thin ferromagnetic film is 1-6 wt % of Cr, 1-8 wt% of Sb, 3-12 wt% of the sum total of Cr and Sb, 7-14 wt% of Ni, 20-30 wt% of Co, the remainder of Fe.

* * * * *

UNITED STATES PATENT AND TRADEMARK OFFICE
CERTIFICATE OF CORRECTION

PATENT NO. : 4,835,069

DATED : May 30, 1989

INVENTOR(S) : TAKESHI SAWADA, ET AL.

Page 1 of 3

It is certified that error appears in the above-identified patent and that said Letters Patent is hereby corrected as shown below:

ON THE TITLE PAGE.

IN [73] ASSIGNEES

"Canon Kabushiki Kaisha; Tohoku Steel Co. Ltd., both of Tokyo, Japan" should read --Canon Kabushiki Kaisha, Tokyo; Tohoku Steel Co. Ltd., Sendai, both of Japan--.

IN [56] REFERENCES CITED

U.S. PATENT DOCUMENTS, "Shinahata" should read --Shirahata--.

COLUMN 1

Line 28, "I" should read --Ni--.
Line 34, "closs-packed" should read --close-packed--.
Line 39, "must" should be deleted.
Line 45, "improve" should read --overcome--.

COLUMN 3

Line 2, "7 to 14%" should read --7 to 14 wt%--.
Line 17, "$(Fe_{1-x}Co_x)_{1-(a+b+c)} Ni_a Cr_b X_c$" should read --$(Fe_{1-x}Co_x)_{1-(a+b+c)} Ni_a Cr_b X_c$--.
Line 52, "preferably" should read --preferable--.

COLUMN 4

Line 7, "deposition material 61" should read --deposition material 6--.
Line 11, "vapor stream 6," should read --vapor stream 6',--.
Line 13, "stream 6," should read --stream 6',--.

UNITED STATES PATENT AND TRADEMARK OFFICE
CERTIFICATE OF CORRECTION

PATENT NO. : 4,835,069

DATED : May 30, 1989

INVENTOR(S) : TAKESHI SAWADA, ET AL.

It is certified that error appears in the above-identified patent and that said Letters Patent is hereby corrected as shown below:

COLUMN 4

TABLE 1, "Corrosion resistance ○ ◉" should read --Corrosion resistance ◉ ○--

Line 61, "ocuured," should read --occurred,--.

COLUMN 5

Line 17, "Exampls 1 to 12." should read --Examples 1 to 12.--.

COLUMN 6

Line 46, "Examples 8-31" should read --Examples 18-31--.

COLUMN 7

Line 15, "corrorion" should read --corrosion--.
    Line 29, "No. 32, No. 32," should read --No. 32, No. 35,--.

TABLE 8, "Corrosion resistance ○ ○ X ◉ ◉ ◉ ◉ ◉ X" should read --Corrosion resistance ○ ○ X ◉ ◉ ◉ ○ ◉ X--.

UNITED STATES PATENT AND TRADEMARK OFFICE
CERTIFICATE OF CORRECTION

PATENT NO. : 4,835,069
DATED : May 30, 1989
INVENTOR(S) : TAKESHI SAWADA, ET AL.

It is certified that error appears in the above-identified patent and that said Letters Patent is hereby corrected as shown below:

COLUMN 8

Line 3, "abration" should read --abrasion--.
    Line 8, "Abration" should read --Abrasion--.
    Line 11, "frequence" should read --frequency--.

Signed and Sealed this

Twelfth Day of June, 1990

Attest:

HARRY F. MANBECK, JR.

*Attesting Officer*     *Commissioner of Patents and Trademarks*